(12) United States Patent
Nay et al.

(10) Patent No.: US 7,287,083 B1
(45) Date of Patent: Oct. 23, 2007

(54) COMPUTING ENVIRONMENT FAILOVER IN A BRANCH OFFICE ENVIRONMENT

(75) Inventors: Kyrt V. Nay, Mapleton, UT (US); Thomas J. Brough, Highland, UT (US); Scott A. Isaacson, Kamuela, HI (US); Robert Wipfel, Draper, UT (US)

(73) Assignee: Novell, Inc., Provo, UT (US)

( * ) Notice: Subject to any disclaimer, the term of this patent is extended or adjusted under 35 U.S.C. 154(b) by 80 days.

(21) Appl. No.: 10/393,676

(22) Filed: Mar. 20, 2003

(51) Int. Cl.
*G06F 15/173* (2006.01)

(52) U.S. Cl. ................................... 709/229

(58) Field of Classification Search ............... 709/220, 709/227, 230, 223, 229, 238; 714/4, 820, 714/2
See application file for complete search history.

(56) References Cited

U.S. PATENT DOCUMENTS

| | | | | |
|---|---|---|---|---|
| 5,872,930 A | * | 2/1999 | Masters et al. | ............. 709/223 |
| 5,918,228 A | * | 6/1999 | Rich et al. | ..................... 707/10 |
| 6,055,568 A | * | 4/2000 | Adams | ........................ 709/221 |
| 6,065,120 A | * | 5/2000 | Laursen et al. | ................ 726/5 |
| 6,275,846 B1 | * | 8/2001 | Kondo et al. | ............... 709/200 |
| 6,389,555 B2 | * | 5/2002 | Purcell et al. | ................. 714/10 |
| 6,519,643 B1 | * | 2/2003 | Foulkes et al. | ............. 709/227 |
| 6,804,333 B1 | * | 10/2004 | Liu et al. | ................ 379/88.17 |
| 6,874,031 B2 | * | 3/2005 | Corbeil | ........................ 709/229 |
| 6,928,469 B1 | * | 8/2005 | Duursma et al. | ........... 709/223 |
| 6,985,956 B2 | * | 1/2006 | Luke et al. | ................. 709/229 |

* cited by examiner

*Primary Examiner*—David Y. Eng
(74) *Attorney, Agent, or Firm*—Marger, Johnson & McCollom, P.C.

(57) ABSTRACT

A computer system accesses a list of connections. The list of connections identifies computers, protocols, and/or types of connections that can be used. The computer system attempts to establish a connection to a server. While establishing the connection, the computer system can store a user's credential. If the connection to the server fails, the computer system attempts to access a connection from the list, and uses the stored user credential (if it exists) to authenticate the user on the new connection without requesting the credential anew from the user.

23 Claims, 12 Drawing Sheets

COMPUTING ENVIRONMENT FAILOVER IN A BRANCH OFFICE ENVIRONMENT

FIELD OF THE INVENTION

This invention pertains to networks, and more particularly to the automatically establishing a new connection when one connection is lost.

BACKGROUND OF THE INVENTION

As the ability to connect remotely from one computer to another increases, so too does the problem of maintaining the connection. For example, many businesses are set up with local offices away from the corporate headquarters. Having each office maintain its own set of files would be costly and counterproductive: replicating files to each office takes time and opens the door to the possibility of different versions of the same files.

Rather than having each office maintain a complete file set, instead each office can maintain a set of local files only. To access files that are shared across offices, each office connects to a server maintained at some central facility. This system avoids the need to distribute files to the different offices, which in turn avoids the possibility of different file versions.

To help maintain redundancy of operations, the central facility can have more than one server accessible from the remote office. Multiple servers have an additional advantage: different remote offices can connect to different servers. Not only does this allow for redundancy, but it also distributes the load across many servers, preventing one server from becoming overburdened.

When a user at one of the remote offices wants to access a file from the central server, the user logs in to the central server. The user provides a login ID and a password, which the server uses to verify his identity. Once the user's identity is determined, the user can then access files.

But what happens if the connection between the remote office and the central server is lost? If the connection between the remote office and the central server is lost, then the user has lost access to files on the central server. Worse, the user has to establish a new connection with another server, requiring the user once again to provide his login ID and password.

A need remains for a way to allow the remote computer to automatically establish a new connection without involving the user that addresses these and other problems associated with the prior art.

SUMMARY OF THE INVENTION

The invention is a method and apparatus for performing automatic failover of an environment. A client establishes a connection for a user. When the connection is lost, the client checks a list of connections. Each connection in the list of connections is attempted until a new connection is established. The client can originally store the user's credential, so that the client can use the credential in establishing the new connection. Or, if the user's credential is not stored, the user can be prompted for the credential.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
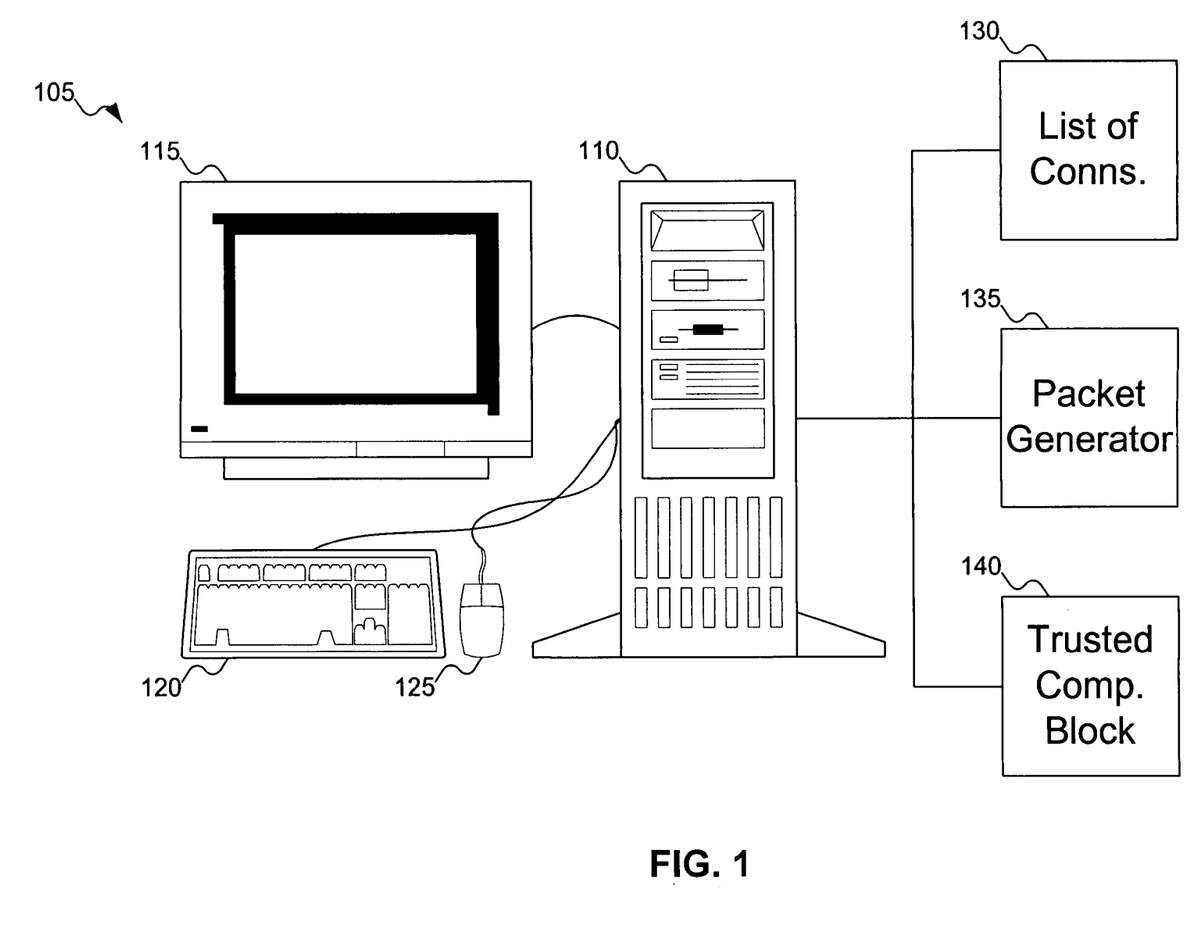
FIG. 1 shows a computer system configured to automatically failover a connection to another computer, according to an embodiment of the invention.

FIG. 1 shows a computer system configured to automatically failover a connection, according to an embodiment of the invention. In FIG. 1, computer system 105 conventionally includes computer 110, monitor 115, keyboard 120, and mouse 125. A person skilled in the art will recognize that although computer system 105 is shown as a desktop personal computer, the invention is not limited to any specific type of computer. For example, computer system 105 can also be an Internet appliance, with monitor 115 and keyboard 120 integrated into the housing of computer 110. Optional equipment not shown as part of computer system 105 in FIG. 1 are other input/output devices, such as a printer. Computer system 105 can also take other forms: for example, a handheld device, such as a personal digital assistant (PDA). Also not shown in FIG. 1 are the conventional internal components of computer system 105: e.g., a central processing unit, memory, file system, etc.

Computer system 105, which can be a client in a client-server model, includes list 130 of connections. List 130 specifies all possible computers to which computer system 105 can connect, in case a current connection is lost. Because the list of connections to use in case the first connection is lost depends on the computer to which the computer system 105 is originally connected, list 130 is typically received across the first connection from the other computer and stored locally. By having list 130 be sent from the server to computer system 105, computer system 105 can perform different environment failovers when connections to different servers are lost. But a person skilled in the art will recognize that list 130 can be generated in other ways: for example, it can be manually entered by a user. List 130 is discussed further with reference to FIG. 2 below.

Computer system 105 also includes packet generator 135. Packet generator 135 is used to generate packets sent to other computers. These packets can be used both to establish a session with another computer, such as a server in a client-server model, and to communicate with the other computers. For example, to establish a session using the Transmission Control Protocol/Internet Protocol (TCP/IP), packet generator 135 generates a packet with a destination IP address of the other computer, and sets the synchronization (SYN) flag, beginning a handshake using the TCP/IP protocol. The packet is then sent out across the network, to be routed to the other computer. The other computer (hopefully) responds with another packet, this response packet having both the SYN and acknowledgment (ACK) flags set. Finally, computer system 105 responds with a third packet with just the ACK flag set. This completes the handshake, and communications can now begin between the computers. A person skilled in the art will also recognize that packet generator 105 can generate packets for use with other protocols: for example, NetWare Core Protocol (NCP), Common Internet File System (CIFS), NetWare File Sharing (NFS), AppleTalk Filing Protocol (AFP), etc.

Finally, computer system 105 includes trusted computing block 140. Trusted computing block 140 is a storage used to store user credentials, for use in authenticating the user when a failover occurs. Typically, trusted computing block 140 is a secure storage, accessible neither from outside computer system 105 nor by any software running on computer system 105 (except for the software that uses a user's credential to authenticate the user to a remote server). But a person skilled in the art will recognize that trusted computing block 140 can be omitted, if the user is prompted for the credential any time that a new session needs to be established.

The reader needs to understand the distinction between a connection and a session. A connection refers to the path between (typically) two computers that are talking to each other. If no path exists (for example, the path is severed at some point), then no connection exists. In addition, if the path exists but the computers do not know that they can communicate with each other using the path, then no connection exists. In contrast, a session refers to the use of a connection by a user. As should be apparent, a connection can exist without a session, but a session cannot exist without a connection.

Figure 2:
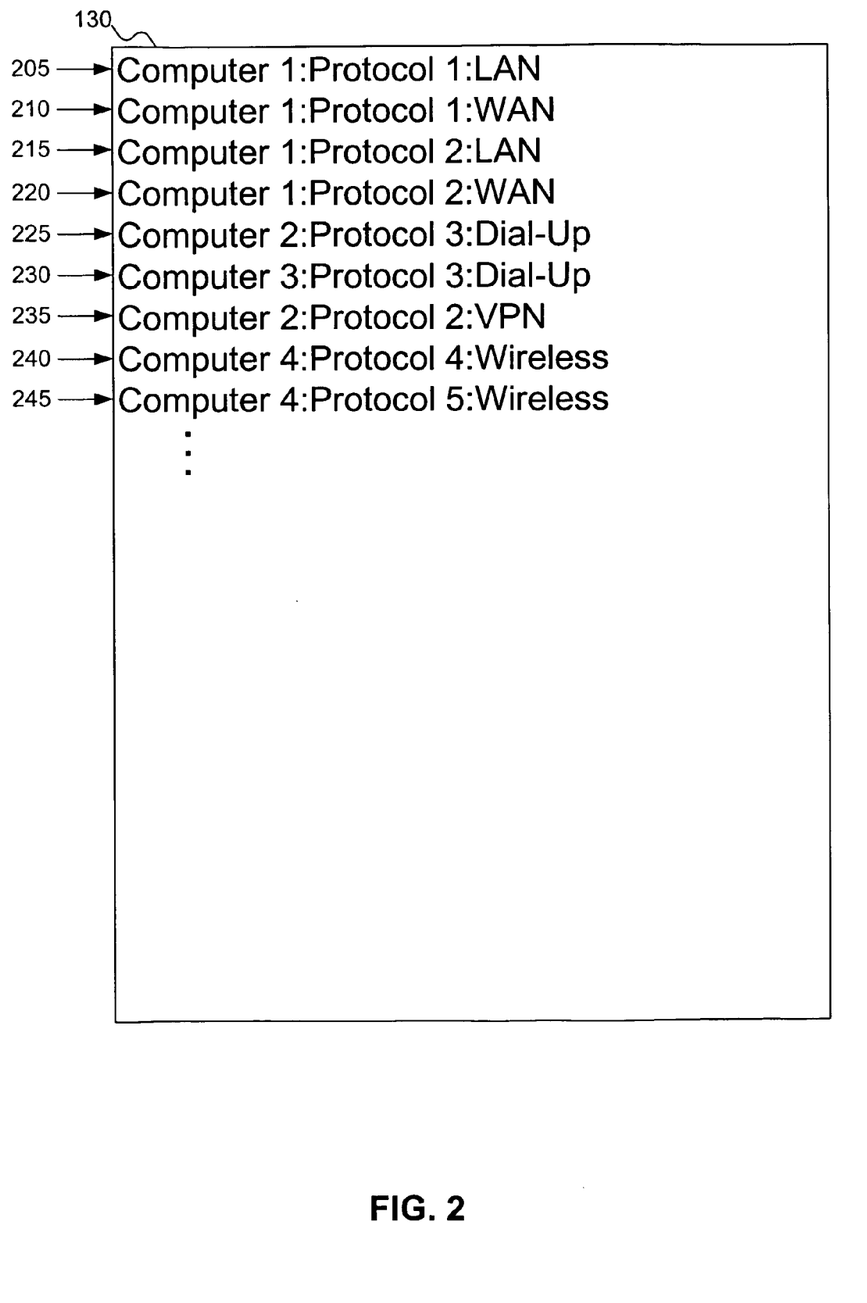
FIG. 2 shows a list of connections for use with the computer system of FIG. 1, according to an embodiment of the invention.

FIG. 2 shows a list of connections for use with the computer of FIG. 1, according to an embodiment of the invention. In FIG. 2, details of list 130 are shown. List 130 identifies computers to which the computer system can connect, the protocols that can be used to communicate with the computers, and the type of connections to be used to reach those computers. (In this context, type of connection refers to different paths a connection might take, such as via a LAN or wide area network (WAN), dial-up connection, virtual private network (VPN) or other secure connection across a public network (such as the Internet), or a wireless network. A person skilled in the art will recognize other possible types of connections.) For example, in FIG. 2, entry 205 indicates that computer 1 is reachable using protocol 1 across the local area network (LAN).

As shown in FIG. 2, the same computer can be reachable using different protocols, or via different types of connections. For example, computer 1 is readable using two different protocols (protocols 1 and 2), and via two different types of connections (LAN and WAN). But it is not required that all (or even any) computers be accessible using multiple protocols or multiple types of connections. For example, entry 230 provides exactly one protocol and one type of connection that can be used to reach computer 3. Similarly, entries 240 and 245 provide two protocols to be used in reaching computer 4, but only one type of connection.

In one embodiment, list 130 specifies an order in which connections are attempted. For example, the connections can be attempted in the order of list 130. As shown in FIG. 2, this means that, before a connection is attempted with computer 2, all different combinations of protocols and connection types are attempted with computer 1. But a person skilled in the art will recognize that connections can be attempted in any order, and it is not required that all connection possibilities be tried with one computer before attempting a connection with another computer. For example, entries 225 and 235 both specify a connection with computer 3. But entry 230 specifies a connection be tried after entry 225 and before entry 235, and thus indicates that a dial-up connection with computer 3 is preferred to a VPN connection with computer 3. A person skilled in the art will also recognize that connection order can be specified externally to list 130. For example, the connection order can indicate that all connections of one type be tried first, or that all connections using a particular protocol be tried first.

Although entries 205-245 all specify protocols and types of connections to use, the protocols and/or types of connections can be omitted. If either the protocol or the type of connection is omitted, then a default protocol and/or default type of connection can be used. For example, if any entry does not include a protocol and TCP/IP is specified as a default protocol, then the TCP/IP protocol can be used for that connection.

Figure 3:
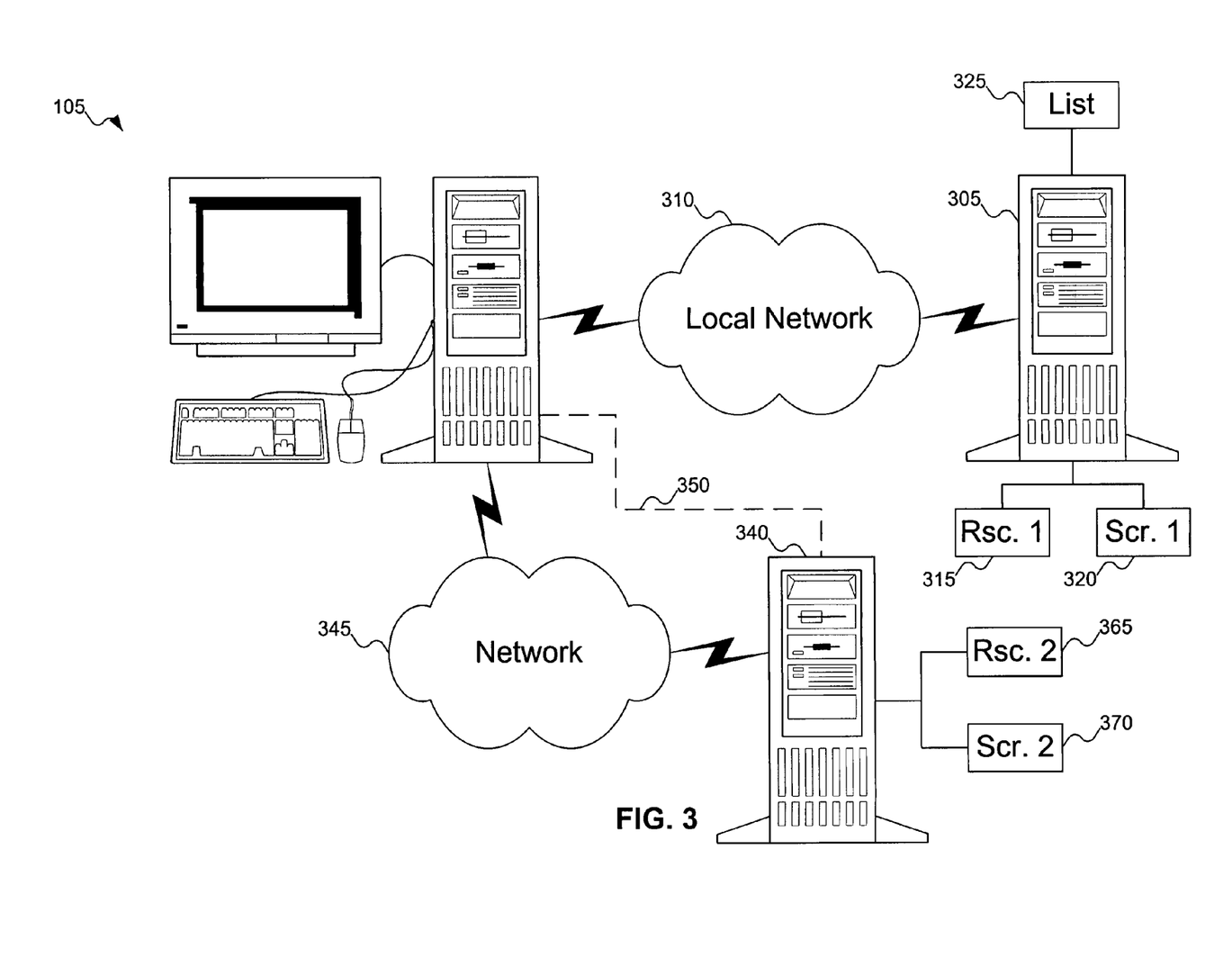
FIG. 3 shows the computer system of FIG. 1 as a client performing a failover of a connection to a server, according to an embodiment of the invention.

FIG. 3 shows the computer of FIG. 3 performing a failover of a connection, according to an embodiment of the invention. In FIG. 3, computer system 105 is a client connected to server 305 via local network 310. Server 105 is the preferred connection point for computer 105, and local network 310 is a private corporate network, separate from any external networks. Server 305 provides access to resources, such as resource 315 and script 320.

When the user logs in to server 305 from computer system 105, the user provides a credential to computer system 105. For example, the credential can be a login ID and a password, a typical credential combination today. Computer system 105 can then use the credential to authenticate the user to server 305, allowing the user to begin accessing resources on server 305. If the credential is a login ID and password, the typical approach is for computer system 105 to forward the login ID to server 305. Server 305 responds with a challenge, typically a randomly selected number. Computer system 105 then applies the user's password, and possibly his login ID, to the challenge according to a particular formula, resulting in a response. The response is returned to server 305, which has independently computed the expected response. If the response received from computer system 105 by server 305 agrees with the expected response, then server 305 considers the user to be authenticated, and permits the user to access resources on server 305. For example, script 320 might be a login script designed to be executed when the user logs in, and maps resource 315 to a particular access point on computer system 105.

As part of permitting the user access to resources on server 305, server 305 forwards to computer system 105 a list of connections to use, in case the connection with server 305 is lost. In FIG. 3, server 305 is shown as storing list 325. List 325 is sent to computer system 105 to be stored as list 130 (not shown in FIG. 3). Then, if the connection to server 305 is lost, computer system 105 can try to use the list to perform an environment failover.

As should be apparent, the user credential is information that needs to be protected. If an outsider can access the credential, then the outsider could trick server 305 into thinking that he is the user, and access resources, such as resource 315, to which the outsider should be denied access. Prior art systems keep the user credential secure by storing it only until the user is authenticated by server 305, and then discarding the credential.

A failover occurs when computer system 105 is no longer able to communicate with server 305. This loss of communication can occur for any number of reasons. For example, server 305 might be inoperative, either a planned or unplanned outage. Or computer system 105 might stop operating properly (e.g., the adapter card connecting computer system 105 to local network 310 might fail). But the typical reason for the connection being lost is simply that some intermediary link between computer system 105 and server 305 fails, without affecting either computer system 105 or server 305. For example, local network 310 can include a telephone line between computer system 105 and server 305, the telephone line dedicated to local network 310. If the failure is not within computer system 105, and computer system 105 is still capable of communicating with some other computer, even though computer system 105 is not capable of communicating with server 305 via local network 310, computer system 105 can perform an environment failover and continue to offer the user access to appropriate resources.

In the prior art, if computer system 105 should lose its connection with server 305, then the user would have to specify a new computer with which to communicate, along with the type of connection and the protocol to use, before a new connection could be established. Then, the user would have to re-supply his credential to establish a new session using the new connection. As discussed above with reference to FIG. 1, by using list 130, computer system 105 can automatically failover to a new connection. And by having computer system 105 include trusted computing block 140 in which the user's credential is kept, the user does not have to re-supply his credential to establish a new session.

In FIG. 3, computer system 105 is shown establishing a second connection with server 340, across network 345. Server 340 can be a second remote server, storing a copy of the environment provided by server 305. For example, server 340 includes resource 365 and script 370, which function similarly to resource 315 and script 320 of server 305. (Resource 365 might be a resource that provides the same functionality as resource 315, for example, a file or a printer; and script 370 might configure computer system 105 to map resource 365 to the same access point on computer system 105 as script 320 does for resource 315 on server 305.)

In contrast to local network 310, network 345 might be a public network. In that case, the connection between computer system 105 and server 340 might be encrypted, to protect any data crossing network 345 from interception. In addition, as a back-up connection, instead of just connecting across network 345, second connection 350 can exist between computer system 105 and server 340 (e.g., a dial-up connection via the telephone network). Second connection 350 provides an alternative way for computer system 105 to access data from server 340, in case network 345 is also inaccessible.

Figure 4:
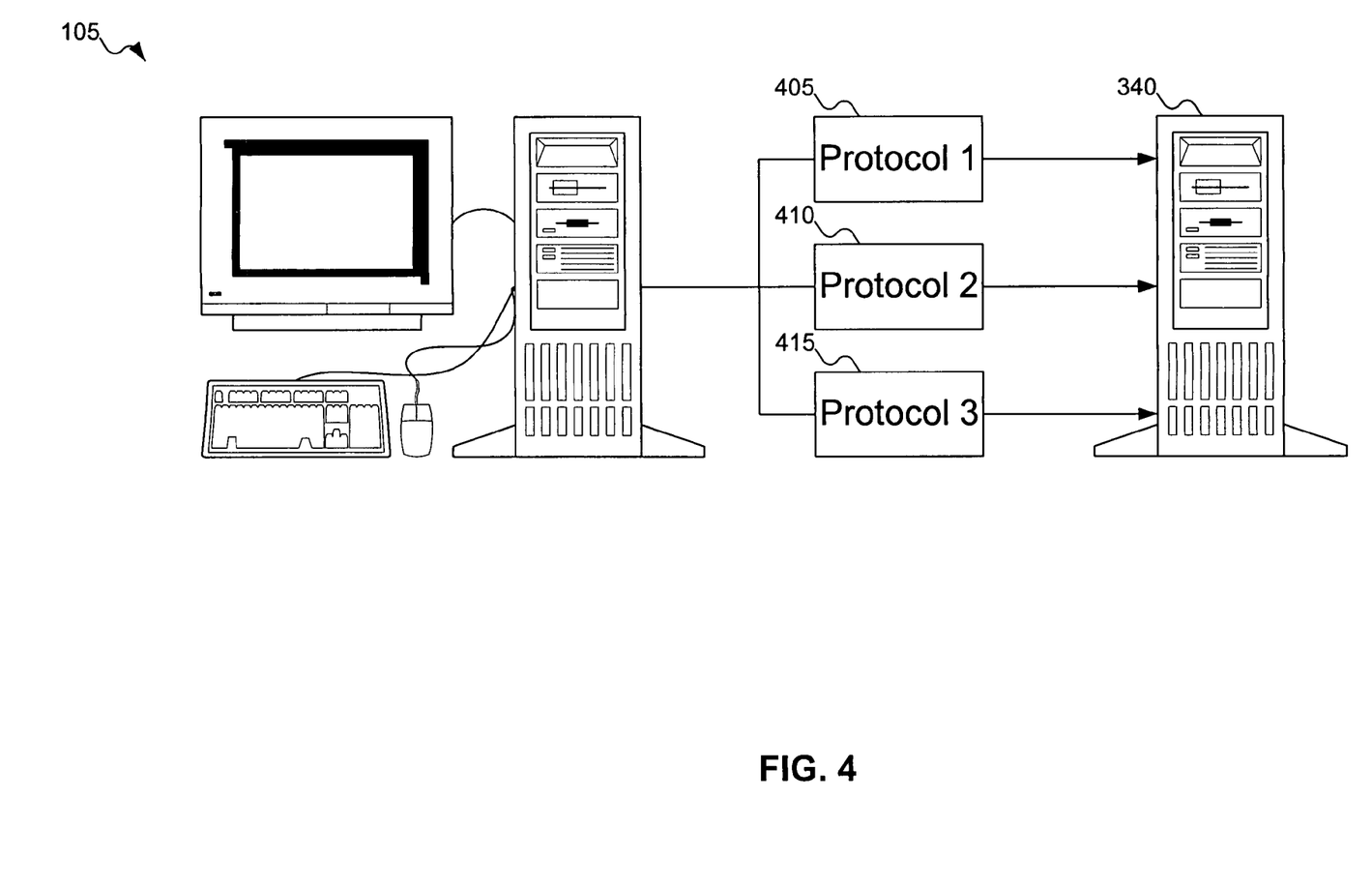
FIG. 4 shows the computer system of FIG. 1 using different protocols to communicate with a second computer, according to an embodiment of the invention.

FIG. 4 shows computer 105 of FIG. 3 using different protocols to communicate with a second computer, according to an embodiment of the invention. As discussed above with reference to FIG. 2, computer system 105 might be able to connect to a specific computer using different protocols. In FIG. 4, computer system 105 is shown attempting to connect to server 340 using three different protocols 405-415. Computer system 105 first attempts to connect to server 340 using protocol 405. If computer system 105 is unsuccessful, it attempts to connect to server 340 using protocol 410, and then protocol 415. A person skilled in the art will recognize that although FIG. 4 shows computer system 105 attempting to connect to server 340 using only three protocols, computer system 105 can attempt to connect to server 340 using any number of different protocols.

Figure 5:
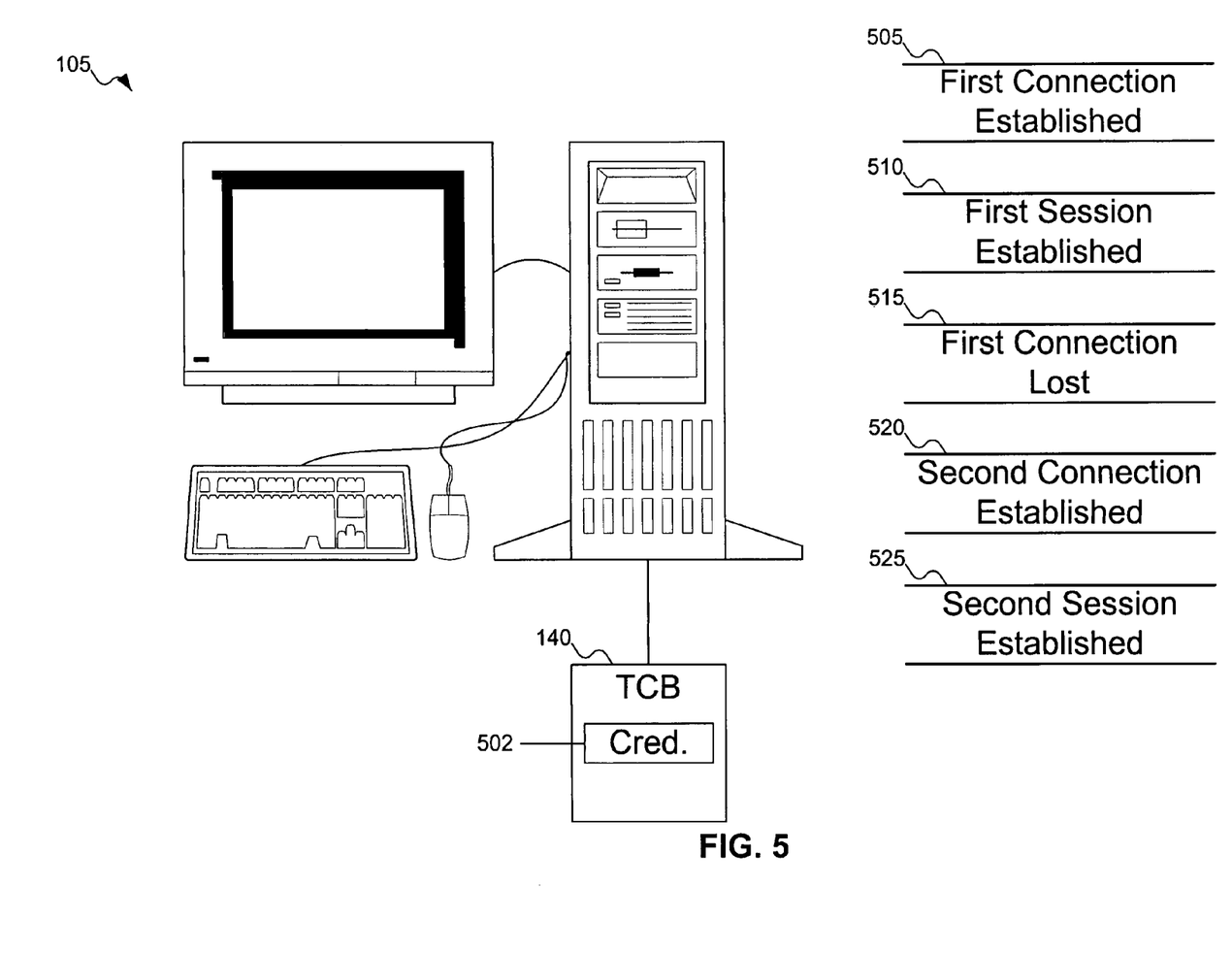
FIG. 5 shows the computer system of FIG. 1 establishing one connection, the first connection failing, and then establishing a second connection, according to an embodiment of the invention.

FIG. 5 shows the computer of FIG. 3 establishing one connection, the first connection failing, and then establishing a second connection, according to an embodiment of the invention. In bock 505, computer system 105 establishes a first connection. Once the first connection is established, computer system 105 can establish a first session running over the first connection, as shown in block 510. Computer system 105 uses credential 502, stored in trusted computing block 140, to establish the first session.

At some point, the first connection is lost as shown by block 515. Computer system 105 then establishes a second connection, as shown in block 520. Finally, at block 525 computer system 105 establishes a second session. As with the first session, computer system 105 uses credential 502 to establish the second session.

Although typically, credential 502 includes a login ID and a password, a person skilled in the art will recognize that credential 502 can take other forms. For example, credential 502 can include a card encoded with unique information that identifies a user. Or credential 502 can include biometric data, such as a fingerprint, retinal scan, or voiceprint data.

Figure 6A:
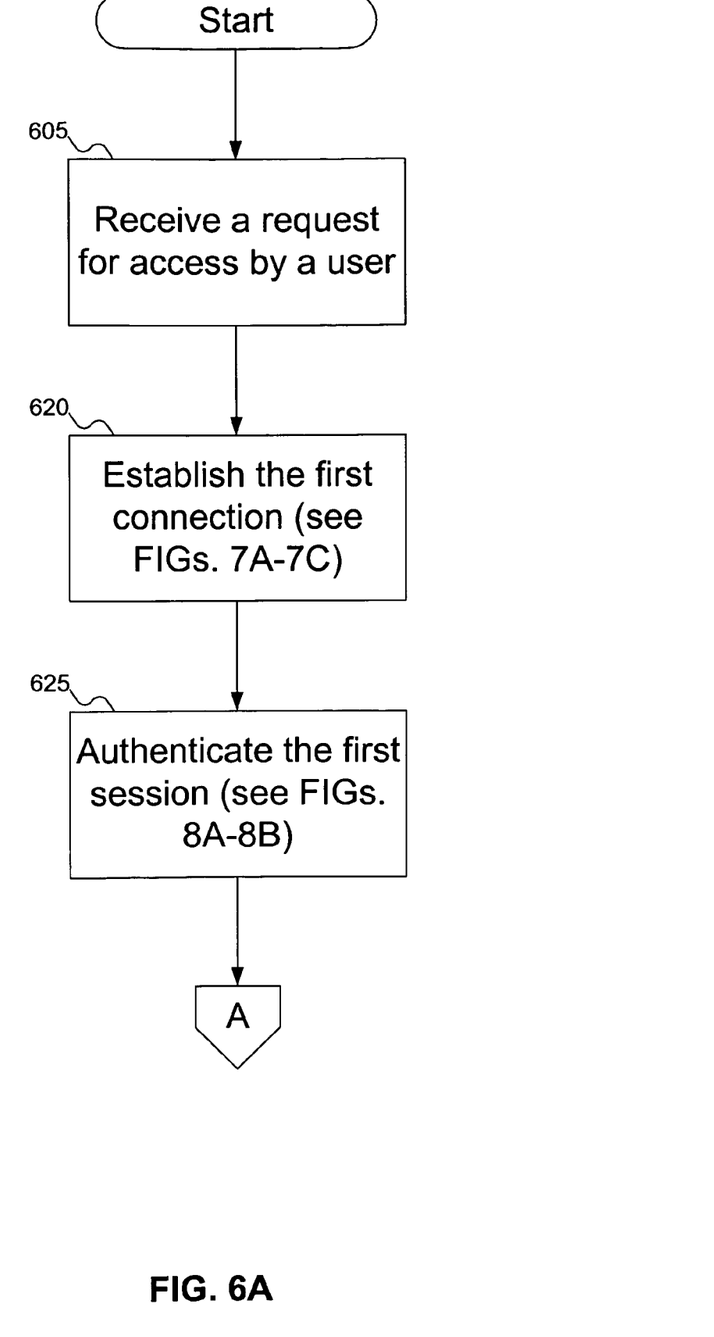
FIGS. 6A-6C show a flowchart of the procedure for performing a failover of an environment using the computer system of FIG. 1, according to an embodiment of the invention.
Figure 6B:
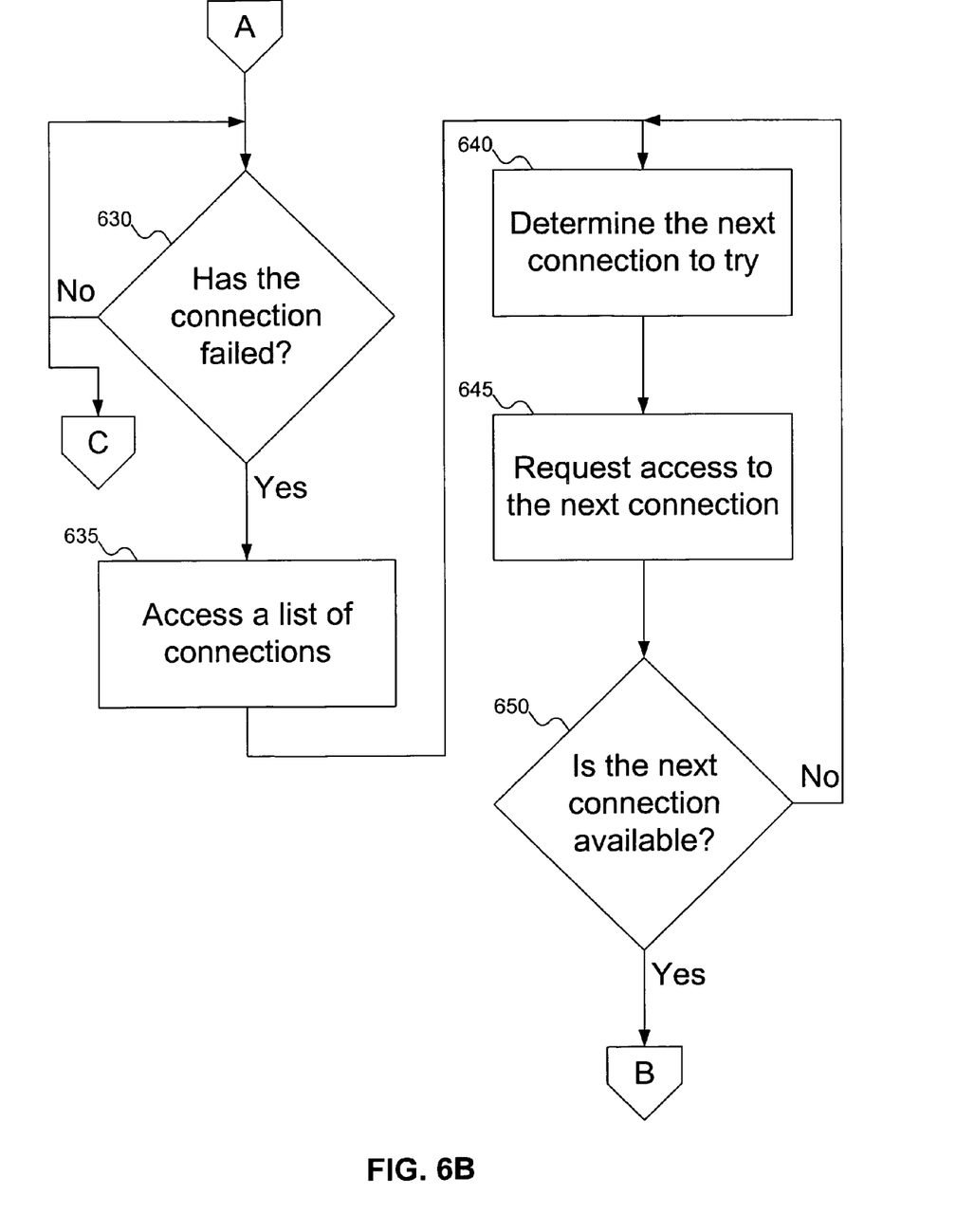
Figure 6C:
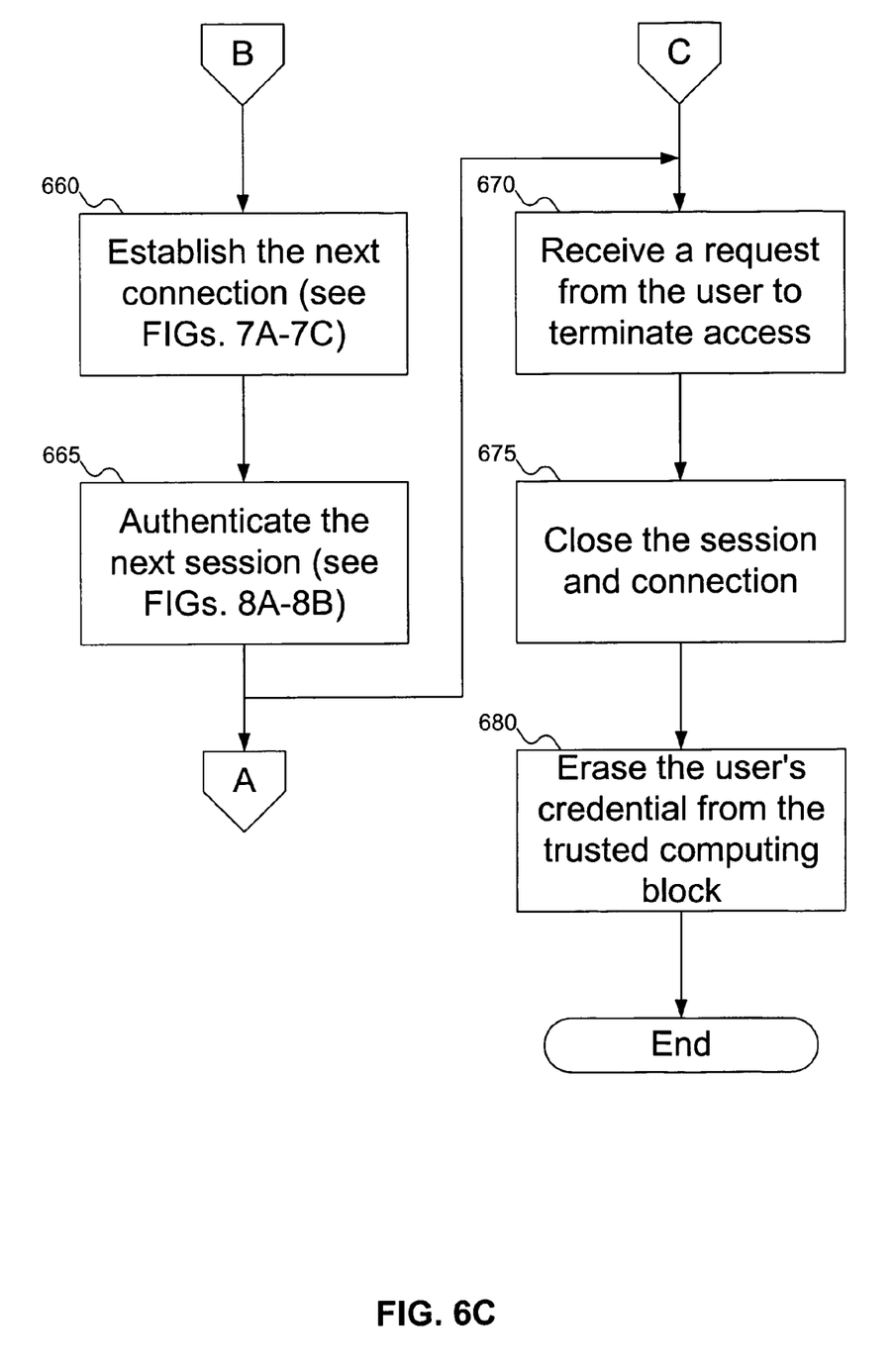

FIGS. 6A-6C show a flowchart of the procedure for performing a failover of an environment using the computer of FIG. 3, according to an embodiment of the invention. In FIG. 6A, at step 605, the computer system receives a request for access by a user. At step 620, the computer system establishes the first connection. At step 625, the computer system authenticates the first session.

After the first connection and first session are established, the computer system stays in step 630 (FIG. 6B) until the first connection fails (or until the user ends the session, in which case processing continues at step 670 of FIG. 6C). Once the first connection fails, then at step 635 the computer system accesses a list of connections. At step 640, the computer system determines the next connection to try. At step 645, the computer system requests access to the connection. At step 650, the computer system determines if the next connection is available. If not, then processing returns to step 640 to try another connection.

Assuming another connection is available, then at step 660, the computer system establishes the next connection. At step 665, the computer system authenticates the next session. Processing can then continue with step 630 of FIG. 6B, if the current connection also fails and the computer system has to perform another environment failover. Otherwise, at step 670 the user requests that access be terminated (that is, the user "logs out"). At step 675, the computer system closes the session and the connection, and at step 680 the computer system erases the user's credential from the trusted computing block.

FIGS. 6A-6C do not show what happens if no failover connection can be found. If no alternative connection can be found with which to perform a failover, then, typically, the user is notified that the connection has failed and than no new connection could be established. The user might also be given the opportunity to specify a new computer with which to connect: in effect, the manual equivalent of the failover described above.

Figure 7A:
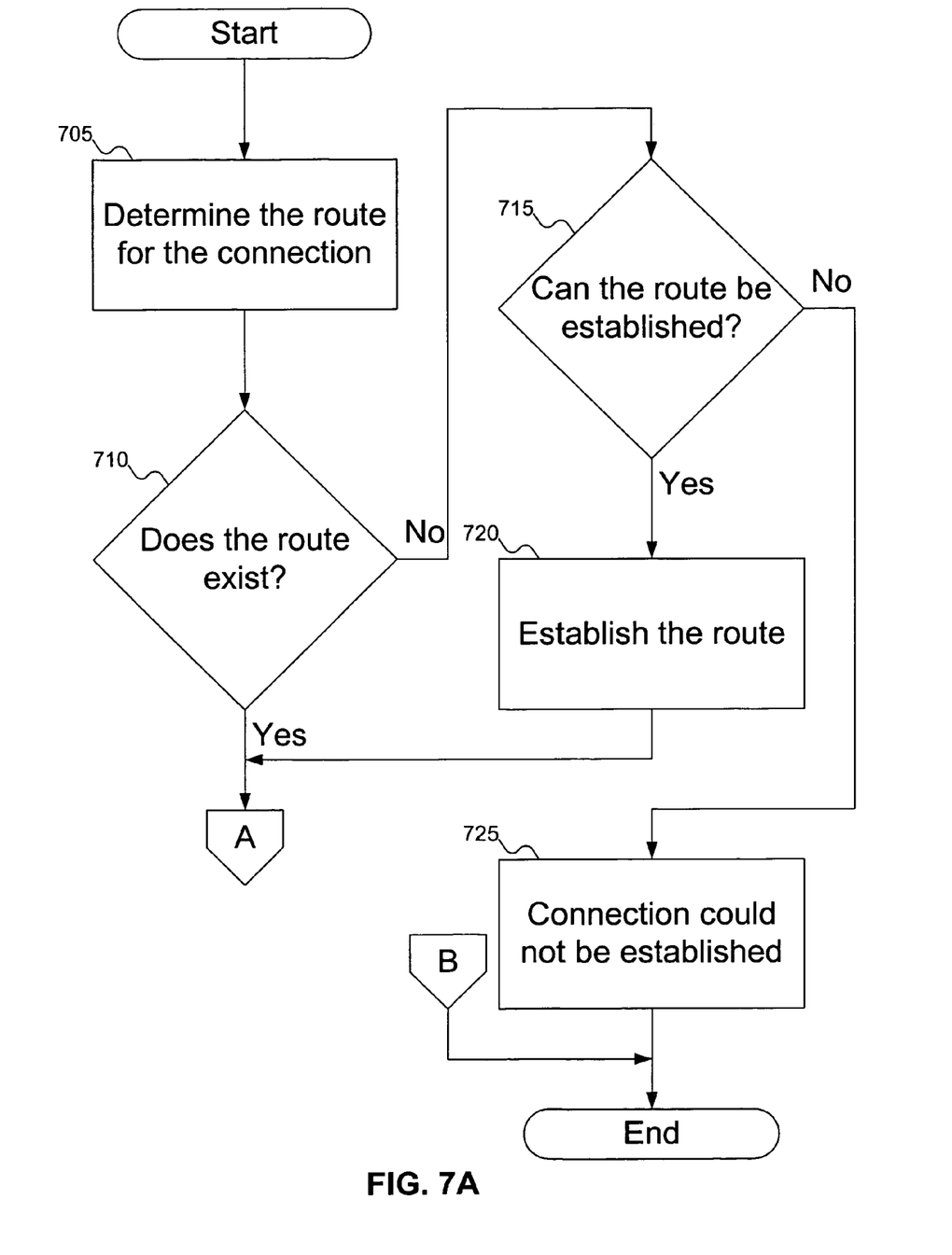
FIGS. 7A-7B show a flowchart of the procedure for establishing a connection using the computer system of FIG. 1, according to an embodiment of the invention.
Figure 7B:
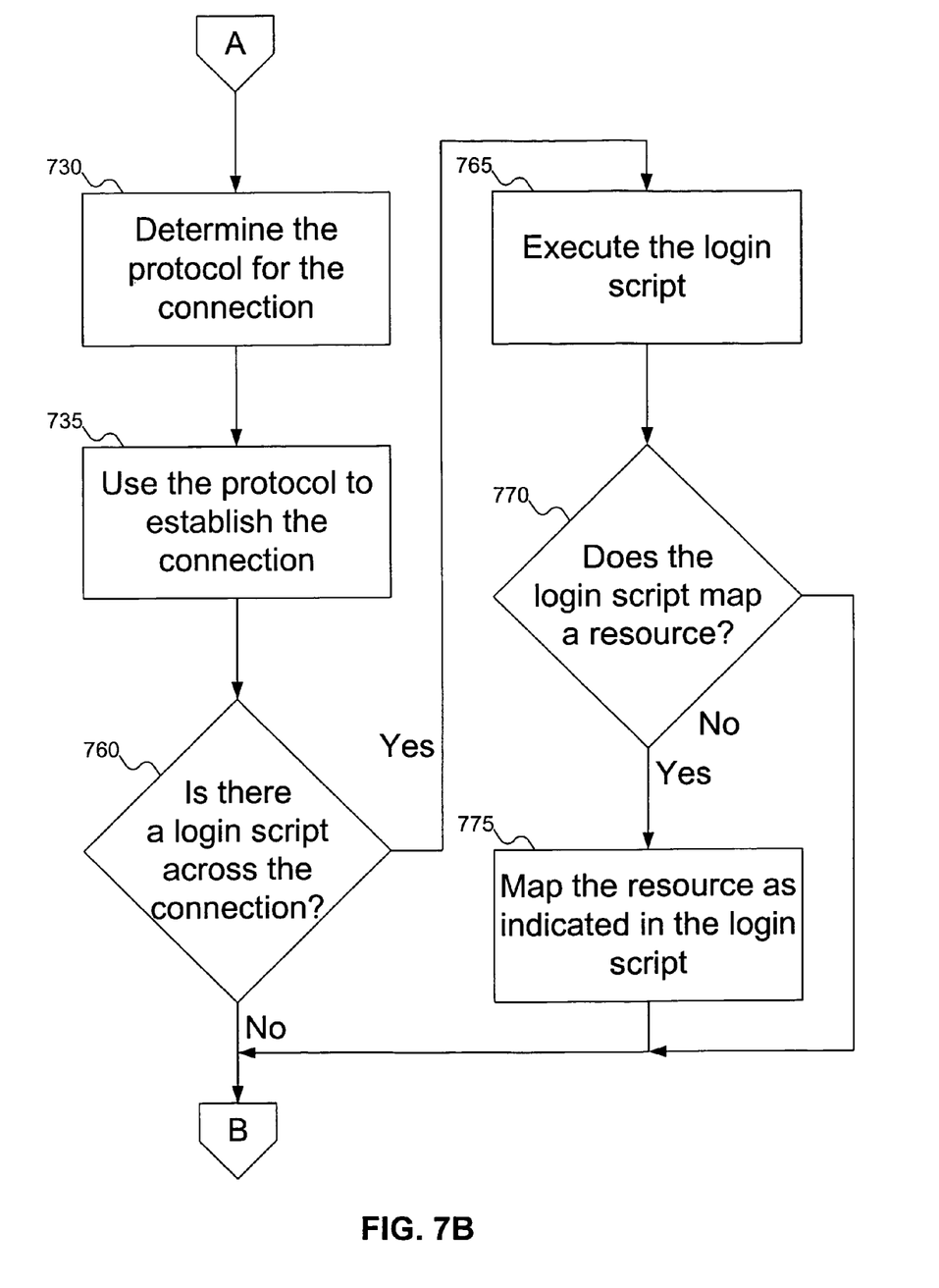

FIGS. 7A-7B show a flowchart of the procedure for establishing a connection using the computer of FIG. 3, according to an embodiment of the invention. In FIG. 7A, at step 705, the computer system determines a route for the connection. At step 710, the computer system determines if the route exists (that is, can the computer system currently communicate with the computer at the other end of the route). If the route does not exist (i.e., the computer system cannot currently communicate with the computer at the other end of the route), then at step 715 the computer system attempts to establish the route. If the computer system can establish the route, then at step 720 the computer establishes the route for the connection. Otherwise, at step 725 the computer system notes the failure to establish the route and continues with the appropriate next step (for example, if the attempt to establish the connection were in step 660 of FIG. 6B, the computer system might determine a new connection to attempt, rather than simply failing). Depending on circumstances, the computer system might notify the user of the failure to establish the route at step 720: for example, to let the user know that the computer system is attempting to establish the connection.

At step 730 (FIG. 7B), the computer system determines the protocol for communicating using the connection. At step 735, the computer system uses the protocol to establish the connection. At step 760, the computer system queries whether there is a login script to execute on the computer at the other end of the connection. If so, then at step 765 the computer executes the login script. This can include mapping a resource, as shown in steps 770-775. At step 770, the computer system determines if there is a resource on the computer at the other end of the connection to map. If so, then at step 775 the resource is mapped, as indicated in the login script.

Figure 8A:
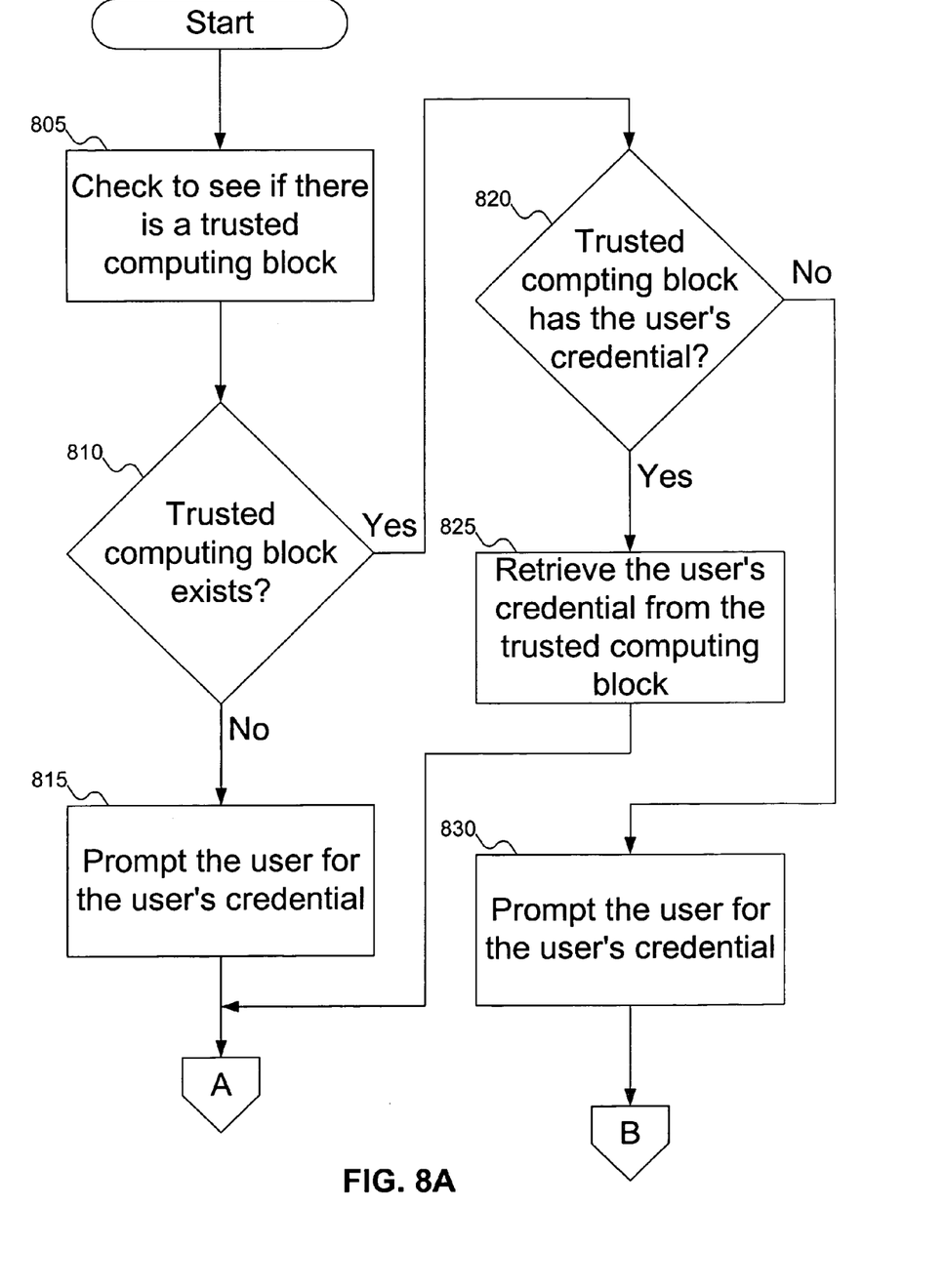
FIGS. 8A-8B show a flowchart of the procedure for authenticating a user using the computer system of FIG. 1, according to an embodiment of the invention.
Figure 8B:
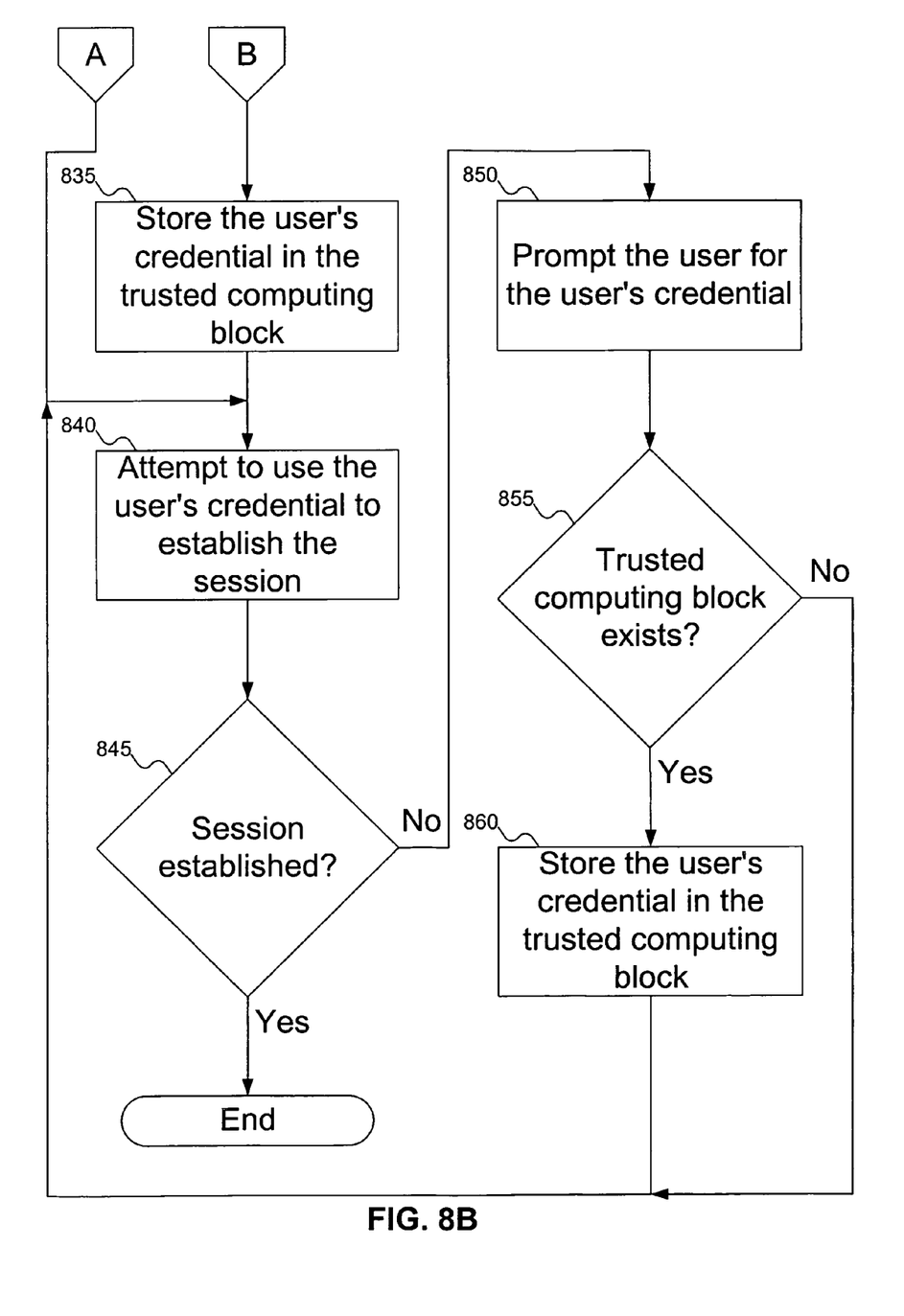

FIGS. 8A-8B show a flowchart of the procedure for authenticating a user using the computer system of FIG. 1, according to an embodiment of the invention. In FIG. 8A, at step 805, the computer system checks to see if there is a trusted computing block. At step 810, the computer system decides what to do, based on whether or not there is a trusted computing block. If no trusted computing block exists, then at step 815 the computer system prompts the user for this credential.

If the trusted computing block exists, then at step 820 the computer system checks to see if the trusted computing block stores the user's credential. At step 825, the computer system decides what to do, based on whether the trusted computing block stores the user's credential. If the trusted computing block stores the user's credential, then at step 825 the credential is retrieved from the trusted computing block. Otherwise, at step 830 the computer system prompts the user from his credential.

If the trusted computing block exists but does not store the user's credential, then at step 835 (FIG. 8B) the computer system stores the user's credential in the trusted computing block. Then, regardless of how the computer system got the credential, at step 840 the computer system attempts to use the credential to establish a session. At step 845, the system checks to see if the session was established. If the session was established, then processing is complete. Otherwise, at step 850 the computer system prompts the user for a new credential. At step 855, the computer system checks again to see if the trusted computing block exists. If the trusted computing block exists, then at step 860 the computer stores the new credential in the trusted computing block. Processing then continues with step 840 to try to establish the session using the new credential.

A person skilled in the art will recognize that an embodiment of the invention described above can be implemented using a computer. In that case, the method is embodied as instructions that make up a program. The program may be stored on computer-readable media, such as floppy disks, optical discs (such as compact discs), or fixed disks (such as hard drives), and can be resident in memory, such as random access memory (RAM), read-only memory (ROM), firmware, or flash RAM memory. The program as software can then be executed on a computer to implement the method. The program, or portions of its execution, can be distributed over multiple computers in a network.

Having illustrated and described the principles of the invention in a preferred embodiment thereof, it should be readily apparent to those skilled in the art that the invention can be modified in arrangement and detail without departing from such principles. All modifications coming within the spirit and scope of the accompanying claims are claimed.

The invention claimed is:

1. An apparatus for performing an environment failover, comprising:
   a computer;
   a list of potential connections that the computer can use, each potential connection in the list of potential connections identifying a server to which the computer can connect and a route to the server, wherein the list of potential connections includes at least a first potential connection including a first route to a first server, a second potential connection including the first route to a second server, and a third potential connection including a second route to the first server;
   means for establishing a first connection in the list of potential connections;
   means for determining if a second connection in the list of potential connections is available; and
   means for automatically establishing the second connection in the list of potential connections upon a failure of the first established connection.

2. An apparatus according to claim 1, wherein:
   the means for establishing a first connection includes:
      means for prompting a user for a credential; and
      means for establishing a first session using the credential for the user; and
   the means for establishing the second connection includes:
      means for re-prompting the user for the credential; and
      means for automatically establishing a second session using the credential for the user.

3. An apparatus according to claim 1, wherein:
   the computer includes a trusted computing block for storing a credential for a user;
   the means for establishing a first connection includes:
      means for prompting a user for a credential;
      means for storing the credential for the user in the trusted computing block; and
      means for establishing a first session using the credential for the user; and
   the means for automatically establishing the second connection includes means for establishing a second session using the credential for the user stored in the trusted computing block.

4. An apparatus according to claim 1, wherein:
   the first potential connection further includes a first protocol for use in communicating with the first server; and the list of potential connections includes a fourth potential connection including the first route to the first server using a second protocol.

5. An apparatus according to claim 1, wherein the means for establishing a first connection and the means for establishing the second connection both include a packet generator, the packet generator operative to send a first packet to establish the first connection and operative to send a second packet to establish the second connection upon a failure of the first connection.

6. A system for performing an environment failover, comprising:
a client;
a trusted computing block on the client for storing a credential for a user;
at least two combinations of a server and a route to the server;
means on the client for establishing a first connection from the client using a first of the combinations of a server and a route to the server;
means for establishing a first session using the credential for the user;
means for determining if a second connection using a second of the at least two combinations of a server and a route to the server is available;
means on the client for automatically establishing the second connection from the client using a second of the combinations of a server and a route to the server if the first connection is lost; and
means for establishing a second session using the credential for the user.

7. A system according to claim 6, wherein the route to the server in each of the at least two combinations is drawn from a set including a local area network (LAN) connection, a wide area network (WAN) connection, a dial-up connection, a virtual private network (VPN) over a public network, and a wireless network connection.

8. A system according to claim 6, wherein the means on the client for establishing a first session and the means on the client for automatically establishing the second session both include a packet generator, the packet generator operative to send a first packet to the server in the first connection requesting the first session using the credential for the user, and operative to automatically send a second packet to the server in the second connection requesting the second session using the credential for the user if the first connection is lost.

9. A system according to claim 6, wherein the server in the first connection and the server in the second connection are the same server.

10. A system for performing an environment failover, comprising:
a client;
a server;
means on the client for establishing a first connection to the server using a credential for a user on the client;
means on the client for determining if a second connection to the server is available if the first connection to the server is lost; and
means on the client for automatically establishing the second connection to the second server if the first connection to the first server is lost.

11. A system according to claim 10, further comprising:
a trusted computing block on the client for storing the credential for the user;
means for establishing a first session over the connection to the server using the credential for the user; and
means for establishing a second session over the connection to the server using the credential for the user.

12. A system according to claim 10, wherein:
the means on the client for establishing a first connection includes a first protocol; and
the means on the client for automatically establishing the second connection includes a second protocol.

13. A system according to claim 10, further comprising a second server; wherein:
the server includes a first resource;
the second server includes a second resource, the second resource being a substitute for the first resource;
the means on the client for connecting to the server includes means for mapping the first resource on the server to an access point on the client; and
the means on the client for connecting to the second server includes means for mapping the second resource on the second server to the access point.

14. A system according to claim 10, wherein the means on the client for establishing the first connection to the server and the means on the client for automatically establishing the second connection to the server both include a packet generator, the packet generator operative to send a first packet to the first server requesting the first connection, and operative to automatically send a second packet to the server requesting the second connection if the first connection is lost.

15. A computer-implemented method for performing an environment failover by a client, comprising:
establishing a first connection to a server;
receiving a credential for a user at the client;
establishing a first session over the first connection using the credential;
determining if a second connection to the server is available after the first connection is lost;
establishing the second connection to the server after the first connection is lost, without involving the user; and
establishing a second session over the second connection using the credential.

16. A computer-implemented method according to claim 15, further comprising storing the credentials on the client.

17. A computer-implemented method according to claim 15, wherein:
establishing a first connection includes establishing the first connection to the server using a first protocol; and
establishing the second connection includes establishing the second connection to the server using a second protocol.

18. A computer-implemented method according to claim 15, wherein:
establishing a first connection includes establishing the first connection to the server along a first route; and
establishing the second connection includes establishing the second connection to the server along a second route.

19. A computer-implemented method according to claim 15, wherein establishing the second connection includes attempting to reestablish the first connection with the server using all available protocols before attempting to establish the second connection with a second server.

20. A computer readable storage medium having stored thereon instructions, that, when executed by a processor, result in:
establishing a first connection to a server;
receiving credentials for a user at the client;
establishing a first session over the first connection using the credentials;

determining if a second connection to the server is available after the first connection is lost;

establishing the second connection to the server after the first connection is lost, without involving the user; and establishing a second session over the second connection using the credential.

21. A computer readable storage medium according to claim 20, wherein:

establishing a first connection includes establishing the first connection to the server using a first protocol; and establishing the second connection includes establishing the second connection to the server using a second protocol.

22. A computer readable storage medium according to claim 20, wherein:

establishing a first connection includes establishing the first connection to the server along a first route; and establishing the second connection includes establishing the second connection to the server along a second route.

23. A computer readable storage medium according to claim 20, wherein establishing the second connection includes attempting to reestablish the first connection with the server using all available protocols before attempting to establish the second connection with the second server.

* * * * *